United States Patent [19]

McGrew

[11] Patent Number: 5,138,471
[45] Date of Patent: Aug. 11, 1992

[54] HOLOCOMPOSER

[76] Inventor: Stephen P. McGrew, 214 Jeter St., Santa Cruz, Calif. 95060

[21] Appl. No.: 556,017

[22] Filed: Jul. 20, 1990

[51] Int. Cl.$^5$ .......................... G03H 1/26; G03H 1/30
[52] U.S. Cl. ...................................... 359/21; 359/22; 359/25; 359/31
[58] Field of Search .................... 350/3.65, 3.66, 3.69, 350/3.75, 3.76, 3.77, 3.78, 3.79, 3.82; 359/21, 22, 25, 31

[56] References Cited

U.S. PATENT DOCUMENTS

| | | | |
|---|---|---|---|
| 3,625,584 | 12/1971 | St. John | 350/3.79 |
| 3,627,400 | 12/1971 | Caulfield | 350/3.78 |
| 3,656,827 | 4/1972 | Gamblin et al. | 3.50/3.79 |
| 3,674,331 | 7/1972 | Caulfield | 350/3.78 |
| 3,894,787 | 7/1975 | Leith et al. | 350/3.77 |
| 4,206,965 | 6/1980 | McGrew | 350/3.76 |
| 4,295,162 | 10/1981 | Carlsen | |
| 4,339,168 | 7/1982 | Haines | 350/3.69 |
| 4,364,627 | 12/1982 | Haines | 350/3.76 |
| 4,411,489 | 10/1983 | McGrew | |
| 4,421,380 | 12/1983 | McGrew | 350/3.78 |
| 4,498,740 | 2/1985 | Caulfield | 350/3.66 |
| 4,832,424 | 5/1989 | McGrew | 350/3.66 |

FOREIGN PATENT DOCUMENTS

| | | |
|---|---|---|
| 1572606 | 2/1970 | Fed. Rep. of Germany . |
| 3343912 | 6/1985 | Fed. Rep. of Germany . |
| 2-149880 | 6/1990 | Japan . |
| WO90/04218 | 4/1990 | PCT Int'l Appl. . |
| 1278672 | 6/1972 | United Kingdom . |

OTHER PUBLICATIONS

T. Yatagai, "Stereoscopic Approach to a 3-D Display Using Computer-Generated Holograms", *Applied Optics*, vol. 15, No. 11, Nov. 1976, pp. 2722 to 2729.

John Rennie, "Move Over, Mr. Spock", *Scientific American*, Jul. 1990, p. 89.

*Primary Examiner*—Bruce Y. Arnold
*Assistant Examiner*—Martin Lerner
*Attorney, Agent, or Firm*—Seed and Berry

[57] ABSTRACT

A method is disclosed for making holographic images by recording an array of pixels which together form a two or three dimensional composite image. Each pixel corresponds to a sampling of just those rays which would pass through a given point on the surface of an ordinary hologram. Every common type of hologram can be made by this method, including 2D/3D holograms, stereograms, and full color holograms. Each pixel is a white light viewable hologram generated by recording a small hologram near the narrowest part of a converging bundle of rays of coherent light, usually with each ray corresponding to one point on the object, and the rays in a pixel being confined to a horizontal plane intersecting the surface of the object.

24 Claims, 7 Drawing Sheets

HOLOCOMPOSER

DESCRIPTION

1. Technical Field

This invention relates to holography and, more particularly, to a method for composing holograms dot by dot.

2. Description of the Prior Art

Holograms have been made since the late 1940s, in which an object is illuminated with coherent light to form an object beam, and the object beam interferes with a mutually coherent reference beam on a suitable recording medium. Emmett Leith (U.S. Pat. No. 3,838,903) described a method for forming a hologram as a sequence of narrow holograms of an object, each exposed from a slightly different position. A method has also been described by D. J. DiBitetto for enlarging a holographic image by repeating small elements of a first hologram over larger areas to form an expanded version of the first hologram (see "Holographic Panoramic Stereograms Synthesized from White Light Recordings," *Applied Optics* 8(8): August, 1969). These two methods required illumination of the object with coherent light and recording the interference between the object beam and a reference beam.

Lloyd Cross and Steve McGrew have described various methods for recording holographic stereograms by forming contiguous elemental holograms of individual frames of a movie film onto a recording medium, see U.S. Pat. No. 4,206,965. The Cross-type hologram is sometimes referred to as a Multiplex hologram, an Integral hologram, or a Composite hologram. In the following discussion, the term Composite hologram includes any kind of hologram wherein an image is composed of separately recorded regions, or pixels. The methods of Cross and McGrew involve using lenses to compress the image in each frame into a thin vertical strip, and the frames are thus recorded as adjacent, parallel vertical strips of elemental holograms. Another method that has been used extensively requires forming elemental holograms by projecting each frame onto a diffuser and then recording the scattered light immediately downstream from a long, thin vertical aperture. Both methods require a motion picture film bearing images of the object. The method using a diffuser requires a second step involving coherent reconstruction to form an image plane hologram of the image.

McGrew (U.S. Pat. No. 4,206,965) described the use of an image convertor to permit real-time input to his hologram recording system by video or direct optical means.

Each of the above systems requires input of a sequence of complete images of the object to a lens and each exposure records the complete two-dimensional image in the film.

Caulfield and Camac in U.S. Pat. No. 4,498,740 ("Caulfield") have described a system for recording two-dimensional holograms, wherein each point from the image is recorded as a separate hologram. Their system is described herein in more detail with respect to FIG. 1.

Leith et al. (U.S. Pat. No. 3,894,787) described a method for producing artificial holograms by calculating a fringe pattern for each object point then summing the patterns.

SUMMARY OF THE INVENTION

It is an object of this invention to provide a method for composing holograms point-by-point, where each point represents the bundle of image rays passing through a point on the hologram surface.

It is another object of this invention to provide a system capable of composing white light viewable, full color holograms.

It is another object of this invention to provide a system for completely computer-controlled production of master holograms.

It is another object of this invention to make holographic stereograms with electronically generated and/or recorded imagery.

It is another object of this invention to make relatively large holograms point-by-point so that the exposure time for each point is very short.

It is another object of this invention to create a hologram from a series of two-dimensional images recorded on video tape.

Other objects of the invention are to provide a hologram recording system having the following attributes: small and compact; permits use of a laser with low coherence; capable of recording holograms of arbitrary size; capable of easily adapting to varying display and recording geometries; capable of accepting a video signal input; capable of extensive digital image modification; capable of high throughput; allows incoherent object illumination; allows simple changes in object-to-image size ratio; and allows control of image position relative to the recording medium.

These and other objects of the invention, as will be apparent herein, are accomplished by sequentially recording point holograms, or pixels, of ray bundles corresponding to projections of the object rays lying in a horizontal plane through a point spaced from the object. The rays in each ray bundle are recorded simultaneously in a single pixel, and the ray bundles are recorded sequentially. The ray bundles recorded at a given lateral position on the recording medium correspond to the appearance the image would have if viewed from that position on the recording medium.

DETAILED DESCRIPTION OF THE INVENTION

Figure 1:
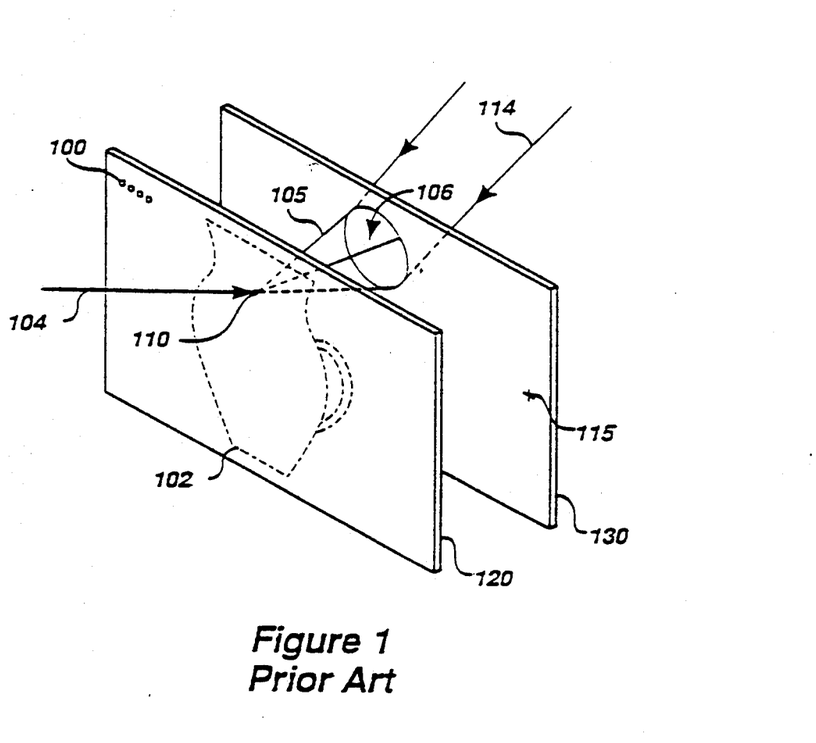
FIG. 1 is an isometric view of the prior art method of Caulfield.

FIG. 1 illustrates the method of forming a hologram using the prior art system of Caulfield, see U.S. Pat. No. 4,498,740. Coherent light beam 104 traces a pattern 102 to diffuser 120. Scattered light from a point 110 on the diffuser 120 impinges on region 106 on holographic recording plate 130. Coherent beam 114 interferes on plate 130 with the scattered light 105 from point 110 to form an elemental hologram in region 106 on plate 130. As the beam 104 moves across the diffuser 120 to strike adjacent points 110, additional elemental holograms which overlap each other are recorded on plate 130 to create a composite hologram from the overlapping patterns. The light 104 diverges from the image point 110 to form a conical image ray bundle 105. The conical image ray bundle 105 is smallest at point 110 on the diffuser 120 and expands until it impinges on the holographic recording plate 130. The light beam 104 is then stepped to an adjacent image point 110 in image 102 and an adjacent conical bundle 105 is recorded on holographic recording plate 130 in a region corresponding to the adjacent image point 110. According to the principles of Caulfield's system, a hologram is composed image-point-by-image-point, and each recorded hologram pattern 106 is from an image ray bundle 105 that diverges from the image point 110.

The system of Caulfield only works well when every image point 110 is located on or very near the recording plane 115, because otherwise the elemental holograms 106 will overlap excessively, resulting in exposures which exceed the dynamic range of the recording medium 130. Caulfield's optical system forms a real image, one image point 110 at a time, and is unable to form holograms which accurately portray the directional aspects of light emanated by each image point (i.e., metallic sheen, direction of illumination, specular reflection, or a burnished appearance). Furthermore, Caulfield's system forms holograms which are white light viewable only by virtue of their negligible depth because both vertical and horizontal parallax are recorded for each point on the object.

Figure 2:
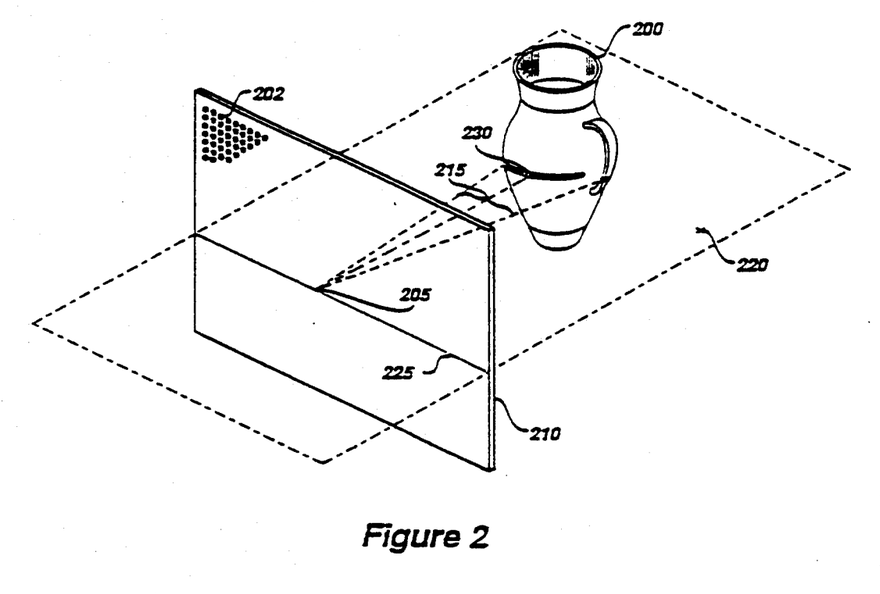
FIG. 2 is an illustration of the relationship between points on an object, points on a rainbow hologram or a composite hologram, and image rays connecting both sets of points.
Figure 4:
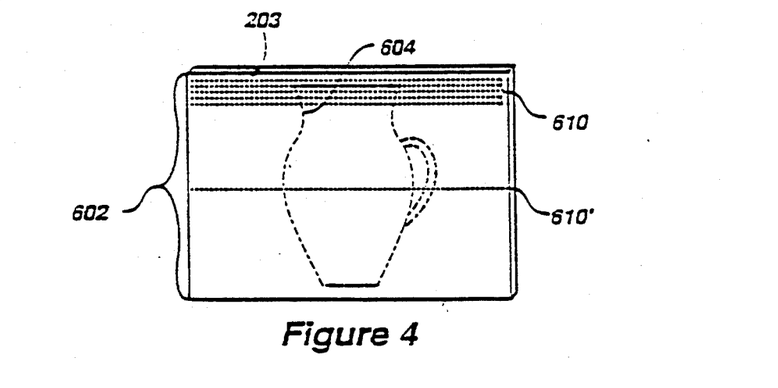
FIG. 4 is a front view of a single video frame of the object.

As illustrated in FIGS. 2 and 4, a hologram constructed according to the principles of the present invention is recorded hologram-point-by-hologram-point on the recording plate 210. According to the principles of this invention, the elemental hologram, or pixel, has the property that, when illuminated at the proper angle, it will reconstruct only those rays from the image which converge to and/or diverge from the location of the pixel.

An object 200, as illustrated in FIG. 2, scatters light in all directions from every point. The representation of this object 200 is recorded on film 210 as a plurality of holographic points, or pixels 202 (greatly enlarged). A given pixel 202 at point 205 on a rainbow hologram 210 records, and reconstructs, only a certain subset of those rays which would be visible to an eye placed at that point 205 if viewing the object directly. The pixel 202 at point 205 represents converging rays lying within a horizontal plane 220 intersecting an object 200 (or an image of this object) and the holographic recording medium 210. A bundle of rays 215 converges through the point 205 from the object points on strip 230 of the object, lying in the plane 220. It is this bundle of rays 215 which is recorded in the pixel at point 205.

Rainbow holograms, 2D/3D holograms, achromatic holograms, full color holograms, and most holographic stereograms are characterized by the property that each horizontal strip 225 in the hologram 210 contains information only about a corresponding horizontal strip 230 on the surface of the image or object 200, as shown in FIG. 2. The task of synthesizing a hologram-point-by-point, with every one of said points positioned at the proper location on the surface of the recording medium is accomplished by the present invention. A device built according to the present invention has the capability of determining and recording separately every one of these converging bundles of rays as a pixel. Each elemental hologram is recorded as a pixel 202, wherein all of the rays to be recorded at a given point 205 on the recording medium are recorded simultaneously in a single exposure. Therefore, it is necessary to determine the correct ray bundle to record at each pixel 202 prior to exposure. The present invention includes a system for and a method of determining and recording those bundles of rays.

The term pixel is used herein to refer to a distinct elemental hologram recorded in the vicinity of a point on the hologram 227. A pixel includes an entire bundle of image rays recorded as a hologram in a small region at a point on a recording medium.

The term pixel is used herein by analogy to the term pixel as used in computer graphics. In the present context, a pixel is not a point on the image corresponding to a point on the surface of an object (unless coincidentally the surface of the image of the object happens to intersect the surface of the recording medium at that point). Instead, it is an elemental hologram, a plurality of which make up a single composite hologram. A pixel recorded according to this invention may ignore the visually irrelevant phase information of the light in each ray and records only the direction and intensity of each ray, although it is also within the scope of the present invention to control the phase of each ray as well. A pixel of a prior art hologram or rainbow hologram records the direction, intensity and the phase of each image ray, whereas the present invention permits the phase to be precisely controlled and recorded or ignored, as desired. Incidentally, when the phase of corresponding rays in all of the pixels in a composite hologram constructed according to the invention is selected to be highly ordered, the speckle in the image is no longer random and can be made to disappear for all practical purposes.

Within the context of this application, it is to be recognized that a replica of an original hologram made according to this invention is equivalent to the original hologram. The term "real focus" or "focus" refers to an approximate point of convergence of a light beam rather than to the focus of an image. The location of the real focus of the object beam is only identical to the location of an image point if the image coincidentally intersects the recording plane at that point. The term object means not only a physical object but a representation of a physical or imaginary object. Thus, a computer-generated image of a nonexistent object is still an image of an object; and the object may be said to have a size, a position, a surface, and other visually detectable attributes of a physical object. A planar bundle of rays is a bundle of rays confined to a plane or a bent plane. Spatially modulated object beams include those beams which are uniformly modulated to be of substantially constant intensity across an aperture.

Figure 3:
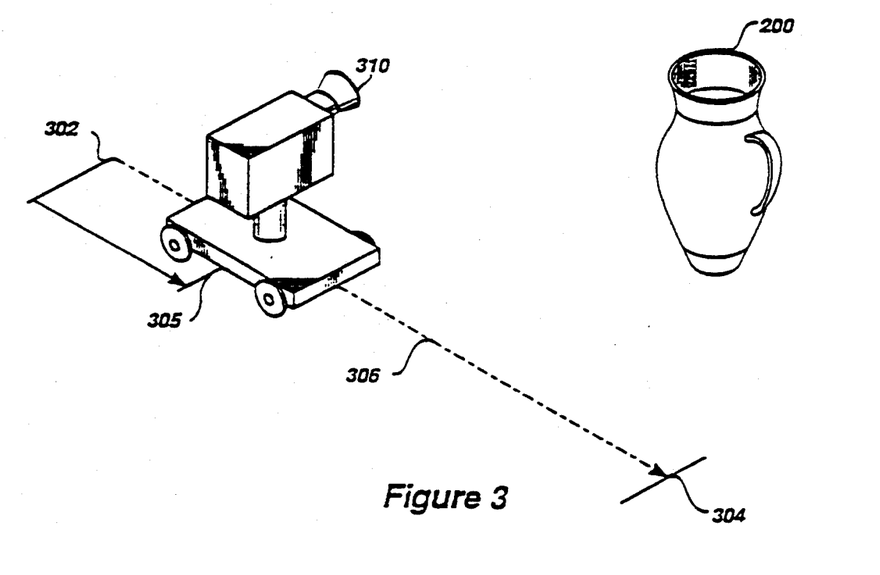
FIG. 3 is an illustration of a method for recording a sequence of images of a subject for conversion into a composite hologram.
Figure 5:
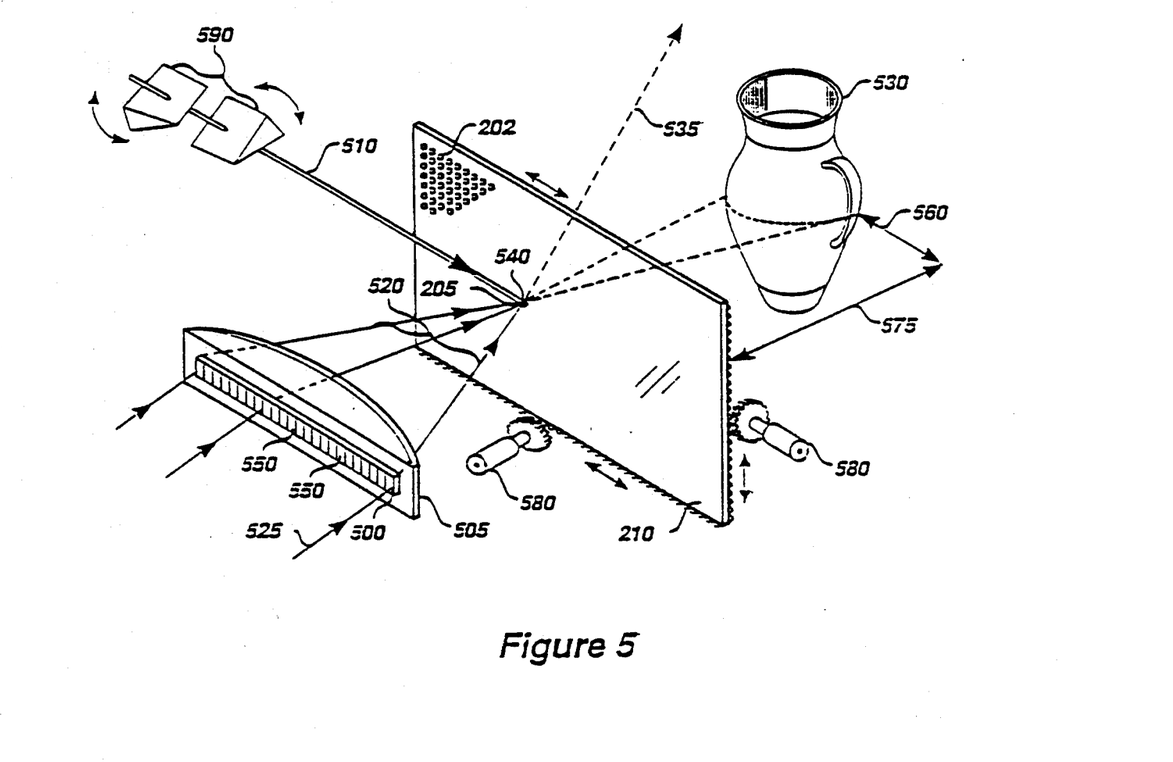
FIG. 5 is a diagram illustrating an apparatus and process for forming a pixel in a composite hologram.

FIGS. 3-5 illustrate the steps in generating a composite hologram 227 according to the principles of this invention. The object 200 of which an image is to made into the hologram is recorded on video tape using video camera 310. The video camera 310 moves from position 302 to position 304 along line 306 as it records a video tape image of the object 200. A series of images of the object 200, one image per frame, is recorded on the video tape. Each frame of the video is recorded from a slightly different point along the line 306 than any other point, because the video camera is moving. Hence, each frame is recorded at a slightly different angle and contains a slightly different image of the same object 200. Several hundred (or thousand) frames are recorded of a single object 200 for use in constructing a hologram of this object 200. The lateral position of the video camera at a given point 305 along the line 306 corresponds to a corresponding pixel's lateral position 205 on the generated hologram 210, as explained in more detail herein. In one embodiment, the camera 310 maintains the same orientation as it moves laterally along line 306, the lens pointing straight ahead.

FIG. 4 is one frame 602 having a two-dimensional video image 604 of the object 200 used to compose the hologram 227. Each frame 602 on the video tape contains a single two-dimensional video image 604 of the object 200. Each frame 602 of the video image 604 was generated in the manner shown in FIG. 3 and thus is a view of the same object from different positions along line 306. Each frame 602 is divided into horizontal rows 610, each row being a raster line composed of dots 203. A single pixel 202 on the hologram 227 is to represent one and only one raster line 610 (labelled 610' for pixel 202 at point 205) of dots 203 of a single frame from the video image 602; and each dot 203 in the raster line will correspond to one ray in the ray bundle contained in the pixel 202.

The information contained in any single pixel 202 is determined by selecting one raster line 610 from the frame of the two-dimensional video image of the object that was recorded from the same lateral position relative to the object as the lateral position of the pixel relative to the image in the final hologram 227. Thus, the lateral position of point 205 of hologram 227 is selected to correspond to the lateral position of point 305 along line 306 while the image is being video recorded, as shown in FIG. 3. The vertical position of the point 205 corresponds to the vertical position of the raster line 610. Correctly recording each pixel itself requires a system for forming the ray bundle corresponding to the pixel's location so that the ray bundle may be recorded as a very small, pointlike hologram at the correct location.

FIG. 5 illustrates a system for recording pixels onto a hologram from a video signal. A raster line from the video image is fed into a spatial modulator 500. A suitable spatial modulator is a liquid crystal light valve, acousto-optic device, or any other high resolution image convertor capable of displaying a single scan line of a video image. The spatial modulator 500 is illuminated with coherent laser light 525 to form an object beam 520. The object beam passes through a lens system 505 so that it converges to a small region 540, a real focus. The rays from the spatial filter array are directed to a position on the holographic plate 210 so that each point in the spatial modulator 500 constructs one ray for every point in the subject image visible from the location of the pixel. Each segment 550 on the spatial modulator 500 corresponds to one ray in the ray bundle 520, so the complete ray bundle impinging at 540 is generated by the spatial modulator 500 and the lens. Near where the object beam converges to its smallest diameter, point 540, the object beam impinges upon a recording medium 210. Simultaneously, a reference beam 510 coherent with the object beam interferes with the object beam, thereby recording a hologram pixel 202 at point 205 of the object beam on the recording medium 210. A transport mechanism 580 repositions the recording medium 210 vertically and laterally between exposures to record each pixel 202 at a different location on the recording medium 210.

In one embodiment, as illustrated in FIG. 5, it is advantageous to provide means 590 for controlling the configuration and direction of the reference beam for each pixel so that the overall pattern of interference fringes emulates the interference pattern formed in a hologram made with a converging or diverging reference beam. This permits the composite hologram to be made, for example, so that a nearby light bulb can illuminate the hologram and an observer in a given position relative to the hologram may see the image in a single predetermined color. A similar effect may be obtained by predistorting the composite image through appropriate selection of object rays. As previously stated, the phase of light recorded in each pixel can be controlled if desired.

The phase and intensity are controllable independently of each other by the input signal into the spatial modulator 500. For example, the spatial modulator 500 can be a liquid crystal modulator, an electro-optic modulator or an acousto-optic modulator of a type known in the prior art, any of which can be configured to control the amplitude or phase of the transmitted light, independently of each other. The phase of light beam 520 after passing through the spatial modulator is controlled to have any desired phase relative to the phase of the input light beam 525. The phase of the output light 520 can be the same as that of light beam 525 or shifted in either direction. Moreover, the phase of a light ray 520 that has passed through segment 550 may be controlled to be different from the phase a second light ray 520 passing through a different segment 550 at the same time, from the same light source for beam 525. Accordingly, the phase is controllable to be highly ordered to permit speckle to be removed from the image.

To construct a composite hologram containing a specific subject image, the object itself or a series of images thereof is analyzed, using straightforward projective geometry, to determine the pattern of points to be recorded in a single pixel, each point being loaded into each segment 550. The composite hologram is then formed by recording the pixels in a dense pattern on a holographic plate. The resolution of the resultant image in the composite hologram is a function of pixel density and the number of distinct points or segments 550 in the spatial modulator 500. The resultant composite hologram contains a subject image 530 located at a distance 575 from the recording plane 210 as shown in FIG. 5.

Figure 6:
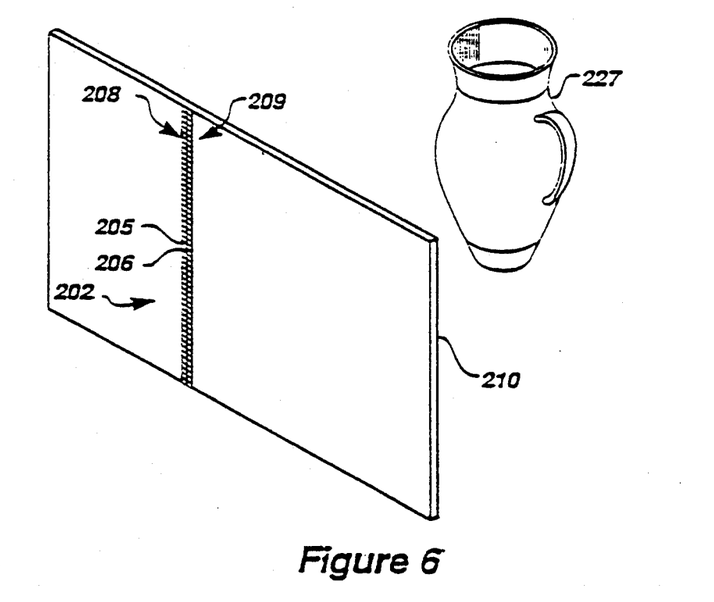
FIG. 6 illustrates a composite hologram formed by the method of the invention in which the image intersects the recording plane.

The vertical and lateral repositioning by transport mechanism 580 to record sequential pixels is best illustrated in completed hologram of FIG. 6. A recorded hologram 210 is composed of a plurality of pixels, generally labelled 202. The next pixel at point 206, corresponding to the next raster scan line, is recorded vertically below the point 205 of the prior pixel. All raster lines from a single frame are recorded as pixels 202 in a single vertical line 208 from top to bottom of the recording medium 210. A single vertical line 208 of pixels 202 thus corresponds to a full frame of the video. After one frame is recorded in a line of pixels 208, the control mechanism 580 steps the recording medium 210 laterally and the next video frame is recorded as an adjacent vertical line 209 of pixels 202. Because the next frame was recorded on the video film after the camera 310 had moved a selected distance, each frame and thus each raster vertical line, will contain a slightly different view of the same object than the prior vertical line. A vertical line of pixels 202 is recorded for each frame of the object to form the final hologram 210 shown in FIG. 6. (The pixels as shown in FIG. 5 are greatly enlarged distinct dots as shown at points 205 and 206 for illustration purposes only; the actual pixels will be relatively small and the vertical lines will be adjacent each other and will overlap in some embodiments.) The composite image 227 will be reconstructed in the same position relative to plate 210, as the position of the object to the path of the camera in FIG. 3, unless the video signal is transformed to provide a different image, as described below.

The order in which the pixels are recorded depends on the arrangement of the information in the video signal, which in turn depends on the method by which the subject image is decomposed into ray bundles. A natural method of forming the video signal is simply to move a video camera at a constant velocity past a subject (e.g., a living person, a solid model, or natural scenery) while the video camera points toward the subject, perpendicular to the camera's path as shown in FIG. 3. In that case, pixels 202 composed directly from the raster lines 610 in the video frame 602 are recorded in vertical lines of pixels 202, each pixel corresponding to one raster line 610 in the video frame and each vertical line of pixels corresponding to one video frame 602, as described. The specific embodiment of constructing a hologram from an object described with respect to FIGS. 3-6 is for a stationary object recorded onto video film with a laterally moving camera, and a different sequence may be used if the video image is generated differently. In any case, the method of this invention is to keep track of each ray of light entering the camera and to record in each pixel those rays which would pass through that pixel from the object if the object were located in a particular position relative to the plate 210.

It is convenient to record information to be displayed on the spatial modulator 500 as a video signal on magnetic tape, then to load the image convertor with a single video raster line for each exposure, as just described. Depending on the optics and the mechanics of the system, it may be desirable to load the spatial modulator 500 with several raster lines for each exposure.

A preferred method of forming the video signal to be fed to the spatial modualator is to store and process the video signal from the video camera to form a transformed video signal which results in a subject image which intersects the recording plane 210 as shown in FIG. 6. This transformation can be performed by digital image processing systems in common use today, and is within the capacity of one skilled in the art of computer graphics and projective geometry. One aspect of the invention is that each pixel is a holographic recording of a ray bundle, and that the position of the image relative to the recording medium is determined by selecting the rays which are recorded in each pixel.

Figure 11:
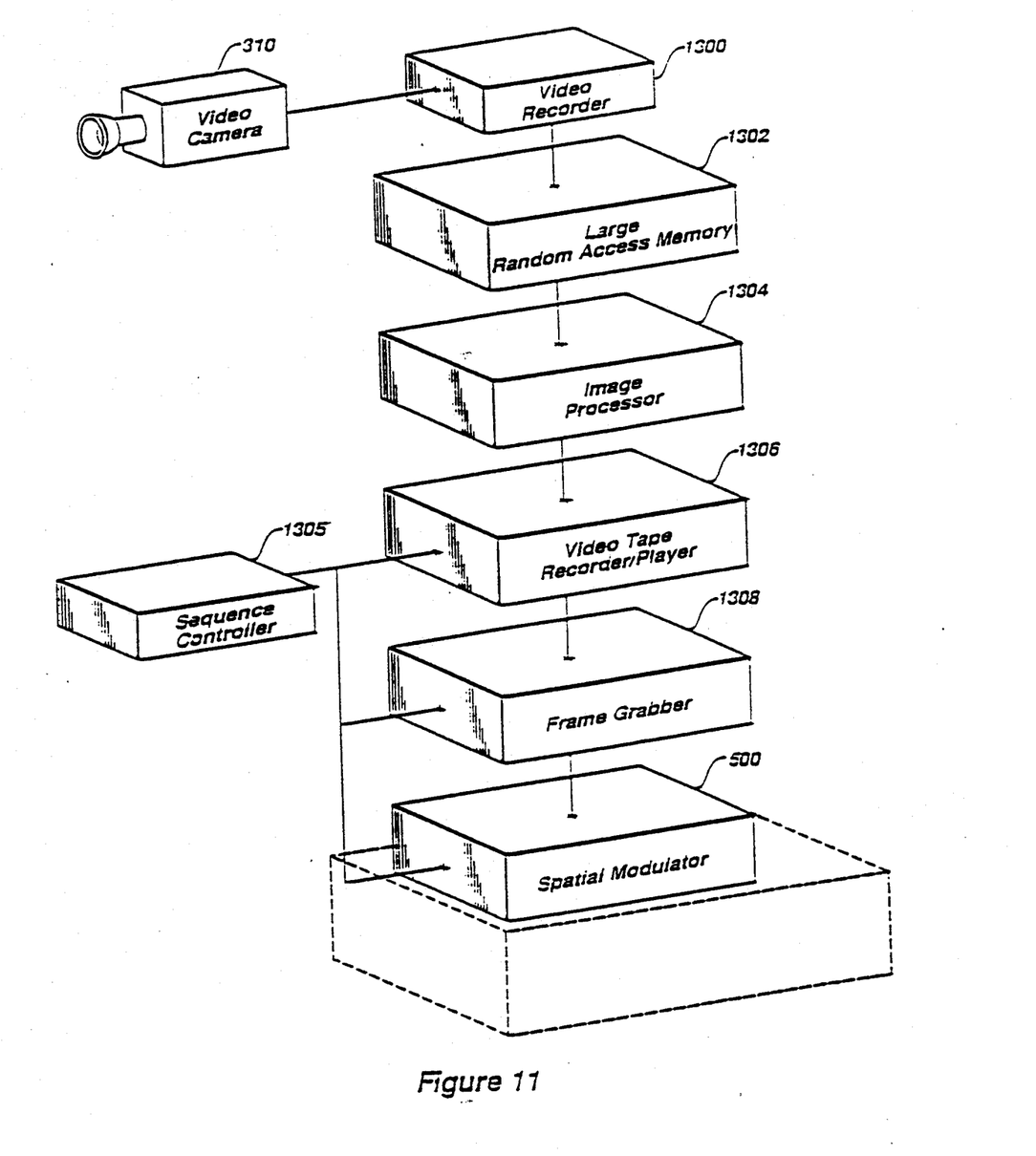
FIG. 11 is a block diagram of an apparatus for forming a hologram composed of pixels using information derived from a video recording.

FIG. 11 is a block diagram of an apparatus for providing the signal for input to the spatial modulator 500. The signal from the video camera 310 is input into video recorder 1300 for recording. When desired, the signal is output to a random access memory 1302, which serves the image processor 1304. The image processor 1304 records a transformed video signal in the videotape recorder/player 1306. A sequence controller 1305 controls a video tape recorder/player 1036, a frame grabber 1308 and the spatial modulator 500 to provide raster scan lines as described. Each of the individual components of FIG. 11 are known in the prior art and components obtained on the open market are suitable.

In an alternative embodiment, a system incorporating the present invention accepts a video signal directly from a video camera 310. Each raster line of the video signal is fed to the programmable spatial modulator 500. With a high-repetition rate pulsed laser, moderate laser power, an acousto-optic device or other high-speed spatial light modulator for input to the holographic recording system and a suitable mechanical scanning system, pixel recording at video rates is possible.

A video image is used as an example only and the image could be any recorded image such as from a photograph, a transparent movie film, a computer generated plot or figure, or any other suitable recorded image, with suitable means provided to extract information to be fed to the spatial modulator. Other means for generating the object beam for recording a pixel include magneto-optic devices, photographic films, photothermoplastic media, and acousto-optic devices.

When information from an incoherent photographic recording such as a video signal or a movie film is used as the primary source of information to determine the ray bundle in each pixel, any subject may be used for the image. For example, natural scenery and living subjects may be recorded in an ordinary fashion as indicated in FIG. 4 by a video camera, using natural or artificial lighting. The video signal may then be processed to form a new video signal wherein each scan line corresponds to the desired points to be displayed on the image convertor. Similarly, a computer generated image may be processed to provide a video signal whose scan lines correspond to the ray bundles in the pixels. Alternatively, an object may be imaged using sound waves, microwaves, x-rays, subatomic particles, or any other means.

In exposing the individual pixels sequentially, a substantial amount of overlap of pixels is acceptable, with the maximum amount of acceptable overlap depending on the type of recording medium and the type of processing used. In ordinary silver halide films and processing, an overlap of 20 or fewer pixels can produce satisfactory results. For example, if the optical system is imperfect, or if the narrowest part of the ray bundle has very large amplitude variations, it is useful to defocus the optical system slightly so that the object beam waist is a small distance away from the recording plate.

One advantage of the present invention is that it permits correction of distortions which may have occurred in the original recording of the object information, or which may occur in the optical system of the hologram pixel recording apparatus. That is, the ray bundle is determined separately for each pixel, so corrections of image distortions can be accomplished in the process of constructing the ray bundles. The angular dependence in the present invention is controlled by the information fed to the system. The present invention specifically controls the directional aspects of light emanated by each image point as well as each point on the hologram.

The system of U.S. Pat. No. 3,206,965 requires a more complex optical system than the present invention. Because the system of U.S. Pat. No. 3,206,965 exposes a vertical line instead of a point at each step, the present method's exposure energy per step can be hundreds of times less than that of U.S. Pat. No. 3,206,965. Of course, the total energy required to record a complete composite hologram is approximately the same in both methods, but less energy per step translates to shorter exposure times per step, which can dramatically reduce the need for vibration isolation and other isolation measures normally taken in holography.

Figure 7:
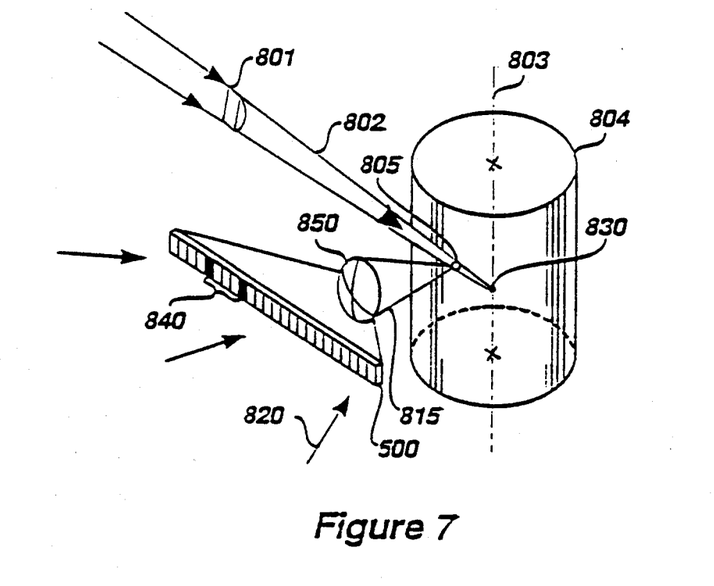
FIG. 7 is a diagram of a modification of the apparatus of FIG. 5, for recording holograms onto a cylindrical recording medium.

Another advantage of the present invention is that it permits a hologram which is intended to be viewed flat to be recorded onto a cylindrical surface. This is illustrated in FIG. 7. To generate an image cylindrically, the reference beam 802 is configured to converge toward the axis 803 of the cylinder 804 and the waist 805 of the ray bundle 815 is at or near the surface of the cylinder, if the final hologram (in its flat configuration) is to be reconstructed with collimated illumination. A lens system 850 may be used to further shape the image bundle prior to being recorded. If the pixel is sufficiently small and the image is not excessively deep, a collimated reference beam 802 may be used for most recording and reconstruction geometries.

Figure 8:
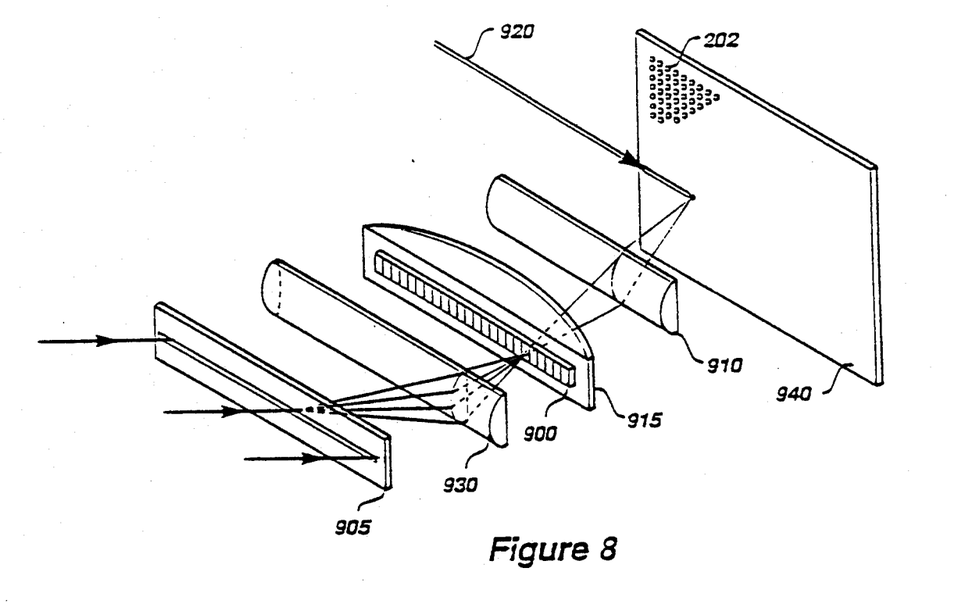
FIG. 8 is a diagram of an apparatus for recording achromatic and full-color composite holograms.

Another advantage of the present invention is that it permits recording of achromatic holograms. In FIG. 8, this is accomplished by vertically diffusing the laser light upstream from the spatial modulator 900 by means of one-way diffuser 905 and using cylindrical lenses 930 and 910 to converge the light vertically directly onto the recording medium. Another optical system 915 is provided to converge the object beam in the horizontal and/or vertical axis. The pixel thus formed is vertically diffuse and therefore achromatic upon reconstruction in white light.

Another advantage of the present invention is that it permits easy recording of 2D/3D holograms, in which the image is composed of a stack of two-dimensional images separated, for example, by a fraction of an inch in depth. A two-dimensional image coincident with the surface of the recording medium may be formed by simply constructing an object beam in which all of the rays are of equal intensity, and recording pixels only where the "light" parts of the image are to appear.

Figure 9:
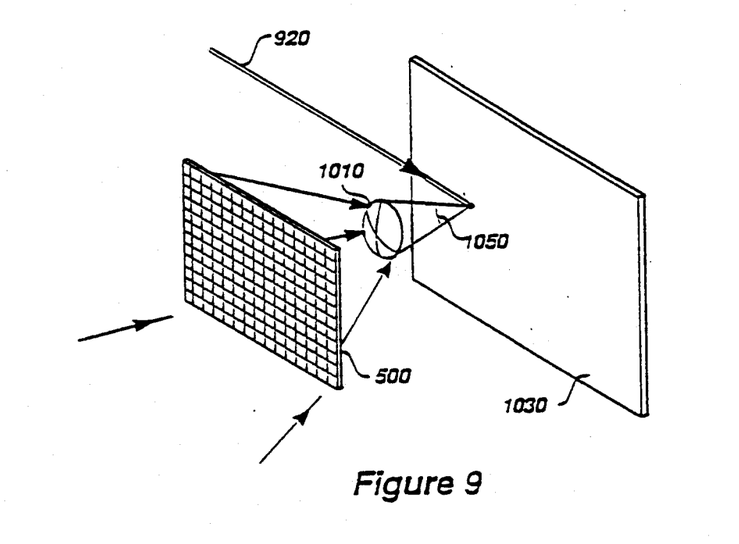
FIG. 9 is a diagram of an apparatus for recording full-parallax composite holograms.

Another advantage of the present invention is that it permits recording of full-parallax holograms. To form a full-parallax hologram, each pixel is formed from a bundle of rays covering a substantial solid angle 1050 as shown in FIG. 9. In this embodiment, the ray bundle is formed from rays which converge, in effect, from the object points within the solid angle 1050 to a point 1020 on the recording medium 1030. A suitable spatial modulator 500 for this purpose is a LCLV television screen. This kind of full-parallax hologram will only be white light viewable if some sort of color-selective means is used such as a thick holographic medium which forms a Bragg hologram, or if the image is very shallow.

Yet another advantage of the present invention is that it may be used to produce full-color hologram masters.

According to U.S. Pat. No. 4,421,380, a full-color hologram can be made by recording each color component as a separate array of dot achromatic holograms (pixels) interleaved with the dot arrays of the other color components. One difficulty with certain embodiments of the full-color method as described in the '380 patent is that it may require recording each color component hologram in laser light of the respective color in order to maintain exact register between the colors in the image when it is viewed from the side. In the present invention it is not only easy to form and accurately position achromatic dot holograms (pixels), but it is also easy to design the ray bundles in each pixel to correspond to the actual directions that the image rays will be diffracted from the pixel when the hologram is reconstructed, and thereby to precompensate for the anticipated off-axis misregistration between color components.

Figure 10A:
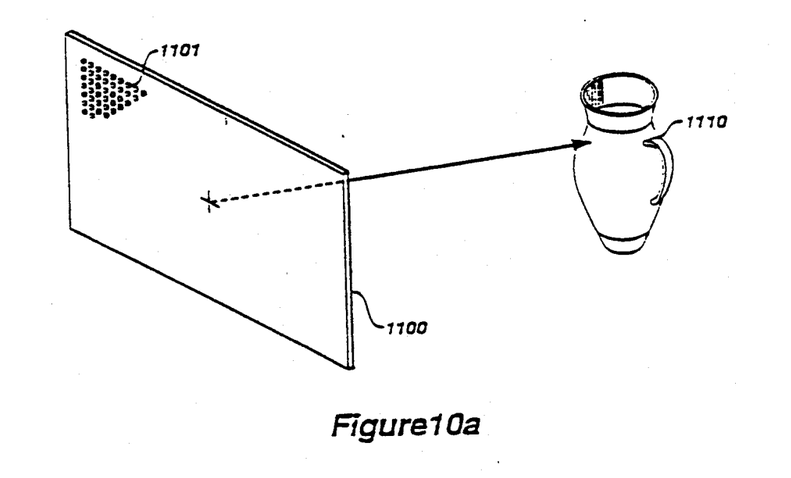
FIGS. 10a and 10b are diagrams of the first and second stages, respectively, in a method for forming an image-planed copy hologram from a virtual-image composite hologram.
Figure 10B:
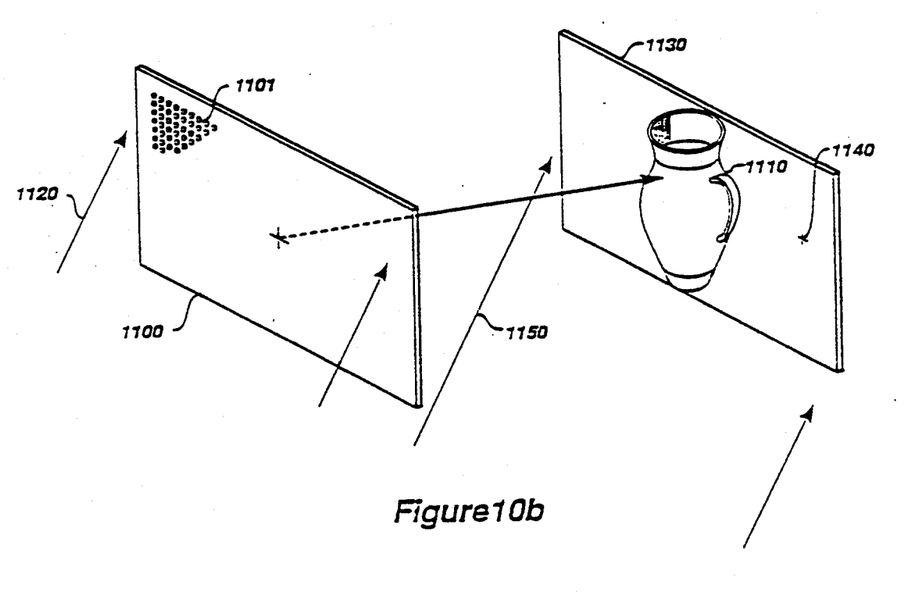

As shown in FIGS. 10a and 10b, it is possible to form a first hologram 1100 as an array of pixels 1101, then to reconstruct the image 1110 on recording medium 1130 to make a second hologram 1140 in which the pixels 1101 are not focused onto the second recording medium 1130 and the image 1110 intersects the hologram 1140. Light beams 1120 illuminate the hologram 1100, are diffracted by the elemental holograms (pixels) 1101, and impinge on second recording medium 1130. A reference beam 1150 also impinges on 1130 to form hologram 1140. This hologram 1140 is known as an image-plane copy of the first hologram 1100. By this method it is possible to minimize the visibility of the individual pixels themselves, which might otherwise detract from the appearance of the image if they are too large.

The coherence of the laser source used to record the pixels does not need to be large. Because each exposure is made only in a very small region, all of the path lengths of the object beam can be essentially equal to within a distance equal to the width of the pixel. Therefore a multimode laser or even a filtered mercury or sodium arc source can be used in this system.

Reflection type holograms may be made in this system by using a reference beam incident from the opposite side of the recording medium to the object beam. Embossing master holograms may be made by recording the pixels on a photoresist coated plate, then making a nickel electroform or other durable copy of the resulting surface relief hologram.

Applications of the invention include creation of holograms for artistic purposes, medical imaging, microscopy, packaging, printing, display, geophysical imaging, and so on. In general, the holograms of the invention may be used in any 3-D imaging application or any application requiring diffractive colored patterns.

I claim:

1. An apparatus for making holograms having a plurality of pixels comprising:

means for forming with coherent light an object beam corresponding to a bundle of image rays reflected from a line portion of an object and passing through a predetermined point positioned away from the surface of said object, said object beam converging to a relatively small real focus;

a recording medium positioned at a location such that said real focus is proximate to the surface of said recording medium, each of said pixels being a hologram of ray bundles converging substantially to a relatively small real focus point on the recording medium; and means for forming a reference beam with coherent light and directing said reference beam onto said recording medium proximate to said object beam to record a hologram pixel on said recording medium.

2. The apparatus of claim 1 wherein said means for forming an object beam includes:
a spatial light modulator means for receiving an electronic input and producing a visual image; and
means for projecting said image of said modulator to form said object beam of said relatively small focus.

3. The apparatus of claim 2 wherein said image of said spatial light modulator is brought to vertical focus substantially upon said recording medium.

4. The apparatus of claim 1 wherein said means for forming an object beam includes:
a linear spatial light modulator means extending laterally for generating a horizontally extending image; and
means for projecting said image of said modulator to form said object beam of said relatively small focus.

5. The apparatus of claim 1 further comprising:
means for determining from an object the spatial information to be carried in said object beam such that said object beam corresponds to a bundle of rays passing through said real focus and reflected from a plurality of through points on said object.

6. The apparatus according to claim 1 further including:
means for converging said reference beam toward the axis of said cylindrical surface; and
means for configuring said bundle of image rays such that the object-to-reference angle for each ray, and the angle of the surface normal to the ray, is the same on said cylindrical surface as it would be if said hologram were recorded on a planar surface.

7. An apparatus according to claim 1, wherein:
said hologram pixels represent a plurality of color components of an image and are vertically diffuse with respect to said image, and wherein said hologram pixels each include a color filter means through which light to reconstruct, or light diffracted by, each of said hologram pixels passes such that only light corresponding to the color component represented by each said hologram pixel contributes to the image reconstructed by said hologram when said hologram is illuminated by polychromatic light.

8. An apparatus for composing holograms of an object, comprising:
an image recording means for recording a plurality of images of an object on a first recording medium, said recording means causing each of said images of said object to contain a view of said object which is different from the view in each other image;
transferring means for transferring horizontal lines from said images on said first recording medium to single pixels on a second recording medium to create pixel holograms of said horizontal image lines;
composing means for composing a composite hologram on said second recording medium, said composite hologram having a plurality of pixels and being comprised of elemental hologram pixels, each of said pixels being a hologram of a planar ray bundle from said image, each pixel being from a different horizontal line of image data.

9. The apparatus according to claim 8 wherein said transferring means includes a spatial modulator means for forming said ray bundle.

10. The apparatus according to claim 9, further including a lens system between said spatial modulator means and said second recording medium to cause said ray bundle to converge to a small region on the surface of said second recording medium to record said image data as an elemental hologram pixel on said second recording medium.

11. The apparatus according to claim 10, further including means for moving said recording medium vertically and horizontally to record pixels sequentially at different locations on the holographic recording medium, said pixels in a single vertical line being recorded from a plurality of horizontal scan lines from the same image in a single recording medium and adjacent vertical lines in said holographic recording medium being recorded from different views of the same object.

12. The apparatus according to claim 8 wherein said image recording means includes a video camera coupled to a motive means which causes said video camera to move while recording images of said object.

13. A method of recording holograms, comprising:
spatially modulating a light beam to form an object beam corresponding to a planar bundle of rays emanting from points on a line portion of an image;
configuring said object beam to converge to a small region on a recording medium;
intersecting said object beam with a reference beam on said small region of said recording medium, thereby forming a holographic pixel in the form of an interference pattern; and
repeating the previous steps for a plurality of planar ray bundles and corresponding regions upon said recording medium to construct a composite hologram of said object.

14. The method according to claim 13, wherein said recording medium is a cylindrical surface, and further including the steps of:
converging said reference beam toward the center axis of said cylindrical surface of said recording medium; and
configuring said ray bundle having the object-to-reference angle for each ray in said ray bundle, and the angle of the cylindrical surface normal to each ray in said ray bundle, the same on said cylindrical surface as the two angles for each ray would be for recording said composite hologram on a planer surface.

15. A method of recording holograms, comprising:
forming a converging ray bundle object beam which converges from points on a line portion of an image to a small point-like region on a recording medium;
intersecting said object beam with a reference beam on said recording medium thereby forming and recording an interference pattern on said point-like region on said recording medium; and
repeating the previous steps for a plurality of said regions upon said recording medium to construct a composite hologram of a two-dimensional image.

16. A method of recording a hologram, comprising:
determining a ray bundle corresponding to straight lines connecting a plurality of points on a line portion of an object to a point in a plane;

forming an object beam corresponding to said ray bundle;

converging said object beam to a small point-like region on a recording medium;

intersecting said object beam with a reference beam on said small region of said recording medium, thereby forming an interference pattern to record a hologram on said region; and repeating the previous steps for a plurality of regions on said recording medium to construct a composite hologram of an object.

17. The method of claim 16 wherein said object beam is formed by passing light to a spatial light modulator having the form of a linear array of small, independently addressable modulation elements.

18. The method according to claim 16, further comprising:

illuminating said composite hologram with coherent light to form a second object beam; and recording a second hologram by illuminating a recording medium with a second reference beam and said second object beam.

19. A method for making a composite hologram, comprising:

recording with a video camera a series of video images of an object from different perspectives along a line as said video camera moves along said line;

processing the information in said images to determine a series of planar ray bundles, each of said ray bundles corresponding to image rays converging from a plurality of points in said object to a point on said line; and recording said ray bundles as elemental hologram pixels on a recording medium, the relatively position of each pixel on said recording medium corresponding to the position of the corresponding said point on said line for said ray bundle, wherein a single raster scan line of one frame is recorded as a single pixel on said recording medium and a vertical adjacent raster scan line is recorded in the correspondingly vertical adjacent position on said recording medium, said entire frame being recorded as a single vertical line of pixels.

20. A composite hologram that provides a three dimensional image when illuminated in white light, said hologram comprising:

a recording medium adapted to record therein image inforamtion;

a plurality of holographic pixels recorded on said recording medium, said holographic pixels each being point-like holograms that contain information from only a single, narrow line portion of an image, each of said pixels having information from a different, single narrow line portion of said image than from each other pixel in said composite hologram, such that each of said pixels has the capacity to reconstruct only a single narrow line portion of an image, and said pixels together have the capacity to reconstruct a three dimensional image of said image when illuminated in white light.

21. The composite hologram according to claim 20, wherein said holographic pixels are arrayed in rows and columns on said recording medium, a column of said pixels containing information of a single view of said image at a selected angle; and adjacent pixels in said column containing information from adjacent single, narrow line portions of said image at said single view of said image at the selected angle.

22. The composite hologram according to claim 21, wherein adjacent columns of pixels contain information of said image from different viewing angles, pixels adjacent each other in a row containing information of said image viewed from different angles.

23. A composite hologram, comprising:

a plurality of sequentially recorded holographic point-like pixels, each of said pixels containing only information about a single horizontal line portion through an image; and a holographic medium bearing said holographic pixels arranged thereupon in a dense array, said pixels in any selected horizontal line on said medium containing only information about said single horizontal line through said image, each of said pixels in said any selected horizontal line further each containing only information about said image corresponding to a perspective view of said image from the location of each of said pixels on said medium, and said dense array of pixels comprising a white light viewable hologram of said image.

24. The composite hologram of claim 23, a portion of said array of holographic pixels in concert defining image points located away from the surface of said recording medium.

* * * * *